United States Patent Office 3,537,676
Patented Nov. 3, 1970

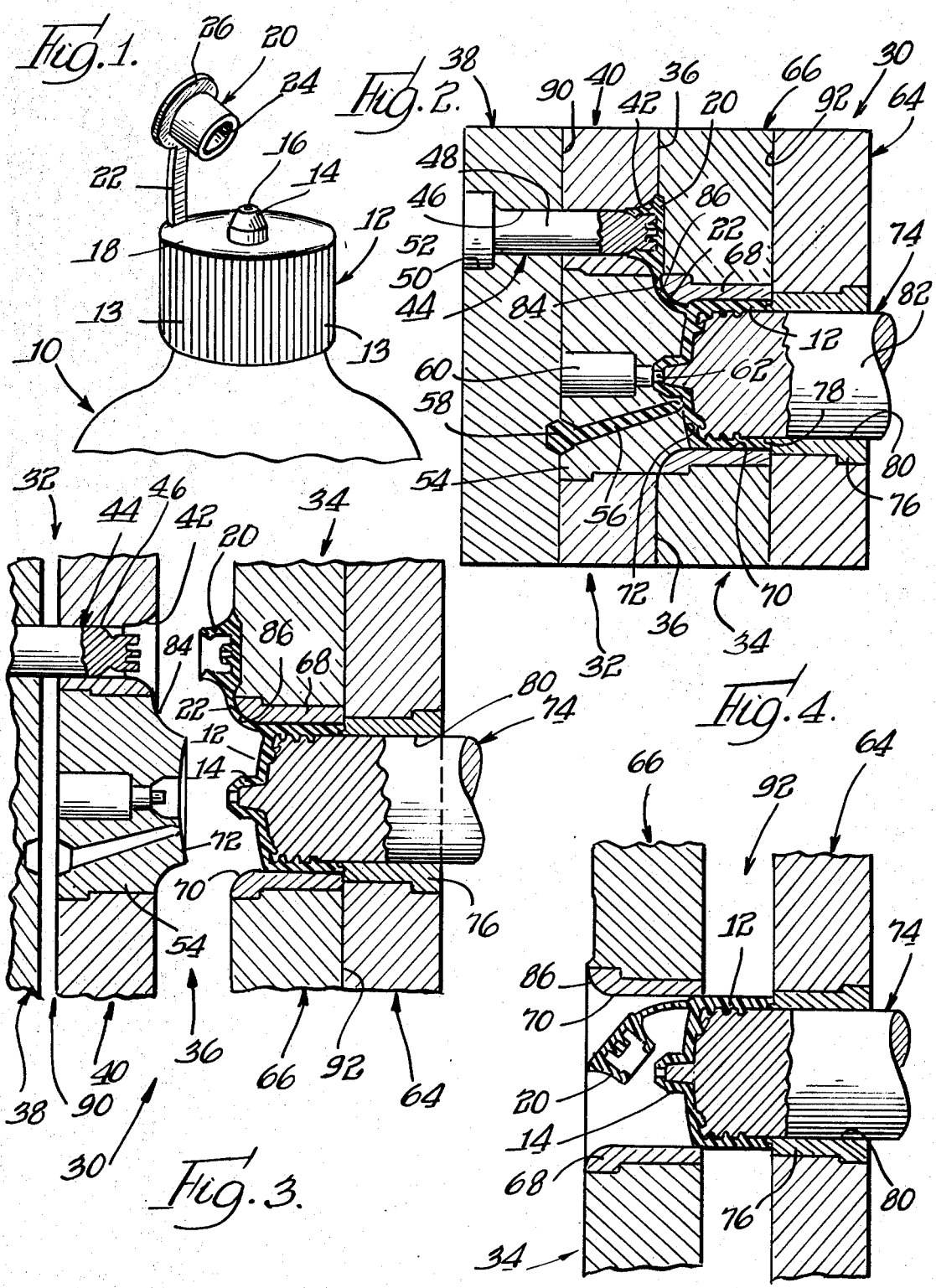

3,537,676
MOLD APPARATUS FOR CLOSURE WITH INTEGRAL CAP
Christian F. Miller, Palos Park, Ill., assignor, by mesne assignments, to Valve Corporation of America, Bridgeport, Conn., a corporation of Delaware
Filed Dec. 20, 1967, Ser. No. 692,235
Int. Cl. B29d 1/00
U.S. Cl. 249—59  4 Claims

ABSTRACT OF THE DISCLOSURE

In molding apparatus for producing a threaded bottle cap having an auxiliary reclosure element, a pair of die plate units defining radially spaced mold cavities for the cap proper and for the reclosure element respectively and a pair of core pins which are retractable in opposite directions, one core pin cooperating to define the reclosure element cavity and the second core pin being externally threaded to cooperate in defining the cavity for the cap proper.

---

This invention relates generally to the art of molding various articles from thermoplastic resins and more particularly to the art of molding plastic bottle caps.

Liquid products such as dishwashing detergent, shampoo and cosmetic lotions, for example, are commonly packaged in bottles made of either resinous plastic or glass; and internally threaded, dispensing caps with an auxiliary reclosure element attached to the cap by a flexible strap have proved popular for use with these products. Sound molding practice requires that reclosable caps of this nature be produced in molds having parallel aligned core pins for the cap proper and for the reclosure element. However, this arrangement has, heretofore made it necessary to provide minute teeth or knurling at some place on the core where it engages the threaded cap proper, for example at the lower edge of the internally threaded skirt. Such roughened surfaces enable the molded part to be held stationary when the core plate is advanced progressively in forcible contact with the cap while the threaded core pin is turned out of the part. This scheme of stripping the parts from the mold has resulted in a slow molding cycle and in concomitant, relatively high moldng costs.

An important object of the present invention is therefore to provide molding apparatus that is arranged to produce parts of the type described in a rapid and economical manner.

A more general object of the invention is to provide a new and improved molding die for producing parts having an internally threaded bore opening in one direction and a blind hole opening in the opposite direction.

These and other objects and features of the invention will become more apparent from a consideration of the following descriptions.

In the drawing:

FIG. 1 is a perspective view of a bottle that has been closured by means of a cap of a type contemplated by the instant invention;

FIG. 2 is a longitudinal, criss-sectional view of molding apparatus constructed in compliance with the invention and shown with the various cavity portions filled with resinous plastic in production of a bottle cap of the type shown in FIG. 1;

FIG. 3 is a view similar to the showing of FIG. 2 but illustrating separation of certain of the die parts to release the reclosure element; and FIG. 4 is a view similar to the showing of FIG. 3 but illustrating a further step in the separation of the die parts so as to pull the reclosure element through the core in one of the medial platens.

Referring now in detail to the drawing, specifically to FIG. 1, a bottle 10 is closed by means of a dispensing cap 12 which is secured to the bottle by means of an internally threaded, annular skirt 13, the threads of skirt 13 cooperatively engaging external threads, not shown, formed on the neck of the bottle. An upstanding dispensing nozzle 14 is fashioned with a dispensing orifice 16 which opens through a top panel 18 of the cap in general alignment with the throat of the bottle. An auxilliary, tubular reclosure element 20 is attached to the cap 12 by an advantageously thick and strong yet flexible strap or web 22, element 20 including a blind bore 24 that is sized to fit snugly over the dispensing nozzle 14. A flange 26 is provided on the top of element 20 to facilitate its manipulation as a reclosure element.

Turning to FIG. 2, molding apparatus constructed in compliance with the present invention is indicated generally by the reference numeral 30; and the apparatus 30 comprises a first die plate unit 32 and as a second die plate unit 34, units 32 and 34 being disposed abuttingly in the molding configuration to define a parting line 36. Die plate unit 32 comprises an outer platen 38 and an inner or medial platen 40, platen 40 being fashioned with a cup-shaped cavity 42 that cooperates with an unthreaded core pin 44 in defining a mold cavity for the auxiliary reclosure element 20. The platen 38 is provided with a bore 46 to receive a stem portion 48 of the core pin 44, platen 38 being additionally fashioned with a counterbore 50 which fittingly receives a radially enlarged head portion 52 of the core pin. In addition, the platen 40 is fabricated to receive an insert element 54; and insert element 54 includes a gate 56 and a runner channel 58 to lead molten plastic material into the cavity proper. Insert 54 is also shaped to receive a pin 60 having a reduced diameter tip portion 62 that defines the dispensing orifice 16 of cap 12.

Die plate unit 34 also comprises two platens, an outer platen 64 and an inner or medial platen 66. Inner platen 66 receives an insert 68 that is fashioned with a tubular opening or hollow 70 which is spaced radially from the cavity 42 to define a portion of the parts cavity for the cap 12. In defining this parts cavity, the hollow 70 specifically cooperates with a conical, concavely truncated and centrally cored surface 72 formed in insert 54 and with an externally threaded core pin 74. In addition, the platen 64 receives an annular insert 76 having an annular end surface 78. Insert 76 also defines a central cylindrical bore 80 which passes a smooth-walled shank portion 82 of the threaded core pin 74. Insert 54 and insert 68 include cooperating surfaces which define a narrow, arcuate channel connecting the cavity 42 and the cavity 70 to form the web 22 of the finished molded part. More specifically, insert 56 is fashioned with an arcuate wall 84; and insert 68 is provided with an arcuate, spaced, confronting wall 86 for the described purpose. It is to be recognized that the channel defined by walls 84 and 86 is easily arranged to develop a thick web 22 because insert element 54 and insert 68 are generally confronting parts. Furthermore, the web 22 may be made to emerge from the cap 12 in a desirably axial direction, rather than radially, whereby to reduce the amount of flexure necessary to seat reclosure element 20 on nozzle 14. As will be appreciated, platens 38 and 40 abut to define a parting line 90, and platens 64 and 66 abut to define a parting line 92.

In use, the molding apparatus 30 will be closed, molten plastic injected into the cavities, and the mold chilled to solidify the plastic, FIG. 2 of the drawing showing this general stage in the molding cycle. To remove the finished cap and closure, platen 38 is retracted to open a space at the parting line 90 and the core pin 44 is drawn out of the cavity 42, as is suggested in FIG. 3. Thereafter, the platen 40 is retracted to open a space at the parting line 36, as is also suggested in FIG. 3.

In the case of prior art molds, the core pin 74 would, at this time, be rotated while the die plate unit 34 was being progressively advanced in the same general direction in which the platens 38 and 40 had been withdrawn. However, in compliance with the present invention and as shown in FIG. 4, the platen 66 is removed from the platen 64, separating these elements along the parting line 92. In the course of these actions, the reclosure element 20 folds down through a desirably small arc of movement to pass through the cavity 70 with the cap 12, web 22 acting as a hinge. Once the platen 66 has cleared the molded part, the entire part is exposed to be gripped and unscrewed from the core pin 74. Rapid stripping of the finished parts from the mold and concomitant economies in production have been achieved in this manner.

With the part removed from the core pin 74, the various parts of the molding apparatus are easily and quickly reassembled for a subsequent shot.

While a particular embodiment of the invention has been shown and described, it should be understood, of course, that the invention is not limited thereto since many modifications may be made; and it is, therefore, contemplated to cover by the present application any such modifications as fall within the true spirit and scope of the appended claims.

The invention is claimed as follows:

1. Molding apparatus comprising: first die plate means having first cavity means defining a first parts element cavity for molding an auxiliary element; second die plate means including first and second platen members defining therebetween a mold parting plane and having second cavity means spaced radially from the longitudinal axis of said first cavity means; and an externally threaded core pin entering the hollow of said second cavity means to cooperate in defining a second parts element cavity for molding a principal element, said mold parting plane being substantially coincident with the base plane of said second parts element cavity whereby, upon separation of said platen members, a molded principal element is exposed for threaded disengagement from said core pin, said first platen member being retractable from said threaded core pin and from said second platen member.

2. Molding apparatus according to claim 1 wherein said first and second die plate means include cooperating cavity means defining a narrow channel connecting said first and second cavity means to form a web in the molded part.

3. Molding apparatus according to claim 1 wherein said first platen member is abuttable with said first die plate means.

4. Molding apparatus according to claim 1 and which further includes an unthreaded core pin entering the hollow of said first cavity means to cooperate in defining said first parts element cavity.

References Cited
UNITED STATES PATENTS

| | | |
|---|---|---|
| 2,217,661 | 10/1940 | Anderson. |
| 2,687,157 | 8/1954 | Cowan. |
| 2,778,533 | 1/1957 | Savary. |
| 2,875,472 | 3/1959 | Marcus. |
| 3,013,308 | 12/1961 | Armour. |

J. HOWARD FLINT, JR., Primary Examiner

U.S. Cl. X.R.

18—42, 2